(12) United States Patent
Kabadi et al.

(10) Patent No.: US 11,943,669 B2
(45) Date of Patent: Mar. 26, 2024

(54) METHOD OF PREVENTING CALL DROP IN VOICE COMMUNICATION NETWORK

(71) Applicant: SAMSUNG ELECTRONICS CO., LTD., Suwon-si (KR)

(72) Inventors: Ajaykumar Kabadi, Bangalore (IN); Prasad Basavraj Dandra, Bangalore (IN); Srinivas Chinthalapudi, Bangalore (IN); Raju Udava Siddappa, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 177 days.

(21) Appl. No.: 17/392,211

(22) Filed: Aug. 2, 2021

(65) Prior Publication Data

US 2022/0053383 A1    Feb. 17, 2022

(30) Foreign Application Priority Data

Jul. 31, 2020   (IN) .............................. 202041032911
Jul. 31, 2021   (IN) ............................. 2020 41032911

(51) Int. Cl.
*H04W 36/00*   (2009.01)
*H04L 65/1066*   (2022.01)
*H04L 65/65*   (2022.01)
*H04W 8/18*   (2009.01)

(52) U.S. Cl.
CPC ..... *H04W 36/0011* (2013.01); *H04L 65/1066* (2013.01); *H04L 65/65* (2022.05); *H04W 8/18* (2013.01)

(58) Field of Classification Search
CPC ... H04W 36/0011; H04W 8/18; H04W 76/19; H04W 4/20; H04L 65/1066; H04L 65/65; H04L 65/1069; H04L 65/1073; H04L 65/1104; H04L 65/80; H04L 65/1016; H04L 65/403; H04L 65/1083
See application file for complete search history.

(56) References Cited

U.S. PATENT DOCUMENTS

| | | | |
|---|---|---|---|
| 9,549,345 B2 | 1/2017 | Shaikh et al. | |
| 9,918,254 B2 | 3/2018 | Chinthalapudi et al. | |
| 2013/0171975 A1* | 7/2013 | Lindner | H04L 65/1083 455/412.1 |

(Continued)

*Primary Examiner* — Vinncelas Louis
(74) *Attorney, Agent, or Firm* — F. CHAU & ASSOCIATES, LLC

(57) ABSTRACT

According to a method of preventing call drop in voice communication network, a session is established for voice call initiated between a first terminal and a second terminal. The method includes receiving a first indication that the first terminal is entering a low-signal area. Further, the method includes disabling one or more media inactivity timers for retaining the session. Furthermore, the method includes storing one or more network parameters when one of the session is retained or when the session is released. Thereafter, the method includes receiving a second indication that the first terminal has exited the low-signal area. The voice call is resumed on the session based on the stored network parameters, when the session is retained upon enabling the respective one or more media inactivity timers. The voice call is re-initiated on a new session, based on the stored network parameters when the session is released.

13 Claims, 16 Drawing Sheets

(56) References Cited

U.S. PATENT DOCUMENTS

| | | | | |
|---|---|---|---|---|
| 2014/0066046 A1* | 3/2014 | Keshavdas | ............. | H04W 4/20 |
| | | | | 455/524 |
| 2015/0201454 A1 | 7/2015 | Shukair et al. | | |
| 2016/0363315 A1 | 12/2016 | Li et al. | | |
| 2017/0034223 A1* | 2/2017 | Arscott | ................ | H04L 65/403 |

* cited by examiner

METHOD OF PREVENTING CALL DROP IN VOICE COMMUNICATION NETWORK

CROSS-REFERENCE TO RELATED APPLICATIONS

The present application claims priority under 35 U.S.C. § 119 to Indian Provisional Patent Application No. 202041032911, filed on Jul. 31, 2020, and Indian Non-Provisional Patent Application No. 202041032911, filed on Jul. 31, 2021, the entire contents of both applications are incorporated by reference herein.

TECHNICAL FIELD

The present disclosure generally relates to communication between user terminals in communication network. More particularly, the present disclosure relates to a method of preventing call drop in a voice communication network.

BACKGROUND

Voice communication networks such as Voice over Long-Term Evolution (VoLTE) and Voice over New Radio (VoNR) (also referred as Vo5G) is the practice of packetizing voice over Internet Protocol (VoIP). VoLTE and VoNR are 3GPP (Third Generation Partnership Project) standard based technologies that provide real-time services over LTE and NR mobile networks, respectively. VoLTE and VoNR empowers high-definition (HD) voice quality making telephonic conversations as real as in-person conversations. uses wider frequency range for HD voice call, reducing background noise and enhancing caller voice. VoLTE and VoNR provides several advantages for mobile users, such as improved voice quality and faster video and messaging connectivity.

Call drop in the voice communication network is a very common phenomenon caused due to various reasons like delay in reporting of neighbour cell measurements, radio signal degradation due to cell coverage limit, interference, and the like. Users with active calls entering poor coverage areas or low-signal areas such as elevators, basements, tunnels, and the like, are bound to see sudden drop in signal conditions, due to loss of audio or video encoded packets. In case of elevators, thick metal sheets used to build the elevators further reduces signal reception leading to the call drop. This leads to transient network outage. Duration of such outage is deterministic in nature, primarily driven by the amount of time a user spends in such area. The user does not have option to control call status or avoid call drop. The call may be dropped just after entering the low-signal area or may not be sustainable until user comes out the low-signal area. The user makes several call attempts to initiate new call in the low-signal area. This leads to bad user experience.

Existing systems use guard timers to abandon active configurations and re-establish connections in case of a cell-edge scenario. In the cell-edge scenario, user moves out of a cell coverage area and is unable to find suitable cell to handover due to poor network planning. In the above scenario, the outage is non-deterministic in nature and duration. For the transient network outage scenario caused due to the user entering the low-signal area, the outage is deterministic and quick call recovery is possible. In such cases, use of the guard timers is not suitable. Further, the existing systems implement elevator signal coverage boosters with different antenna configurations in poor coverage areas. Such infrastructure-oriented solutions have several deployment shortcomings with need for different network entity upgrades and additional maintenance cost. In the existing systems, user terminal transmits stronger signals in the low-signal areas. However, this leads to fast battery drainage and health hazards associated with the strong signal transmissions. In the VoLTE and VoNR, most important Key Performance Indicator (KPI) is call drop rate. Hence, there is a need to overcome one or more limitations of the above-described systems to improve the call drop rate in the voice communication network.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a method of preventing call drop in a voice communication network and a terminal. A session is established for a voice call initiated between a first terminal and a second terminal. The method comprises receiving a first indication that the first terminal is entering a low-signal area. Further, the method comprises disabling one or more media inactivity timers of the first terminal and the second terminal, based on the first indication, for retaining the session. Furthermore, the method comprises storing one or more network parameters associated with the first terminal and the second terminal when one of, the session is retained and when the session is released. Thereafter, the method comprises receiving a second indication that the first terminal has exited the low-signal area. The voice call is resumed on the session based on the stored network parameters, upon enabling the one or more media inactivity timers of the first terminal and second terminal, when the session is retained. The voice call is re-initiated on a new session, based on the stored network parameters, based on the second indication, when the session is released.

In an embodiment, the present disclosure discloses a method of preventing call drop in a voice communication network and a server. The server has established a session for a voice call between a first terminal and a second terminal. The method comprises receiving a first indication that the first terminal is entering a low-signal area. Further, the method comprises intercepting a handover procedure for the first terminal, upon receiving the first indication. Furthermore, the method comprises retaining the session, when the first terminal is disconnected from Radio Access Technology (RAT) associated with the first terminal. Moreover, the method comprises receiving a second indication that the first terminal has exited the low-signal area. Thereafter, the method comprises resuming the voice call on the session, based on the second indication.

In an embodiment, the present disclosure discloses a method of preventing call drop in a voice communication network and a terminal. A first terminal comprises a first Subscriber Identity Module (SIM) and a second SIM. The first terminal is established in a first call with a second terminal using the first SIM. A session is established for the first call initiated between the first terminal and the second terminal. The method comprises detecting a second call on the second SIM from a third terminal. Further, the method comprises disabling one or more media inactivity timers associated with the first call, based on the detection, for retaining the session. Furthermore, the method comprises storing one or more network parameters associated with the first call when one of, the session is retained and when the session is released. Thereafter, the method comprises detecting termination of the second call on the second SIM. The first call is resumed on the session, based on the stored network parameters, upon enabling the one or more media inactivity timers, when the session is retained. The first call is re-initiated on a new session, based on the stored network parameters, when the session is released.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristics of the disclosure are set forth in the appended claims. The disclosure itself, however, as well as a preferred mode of use, further objectives, and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 8A:
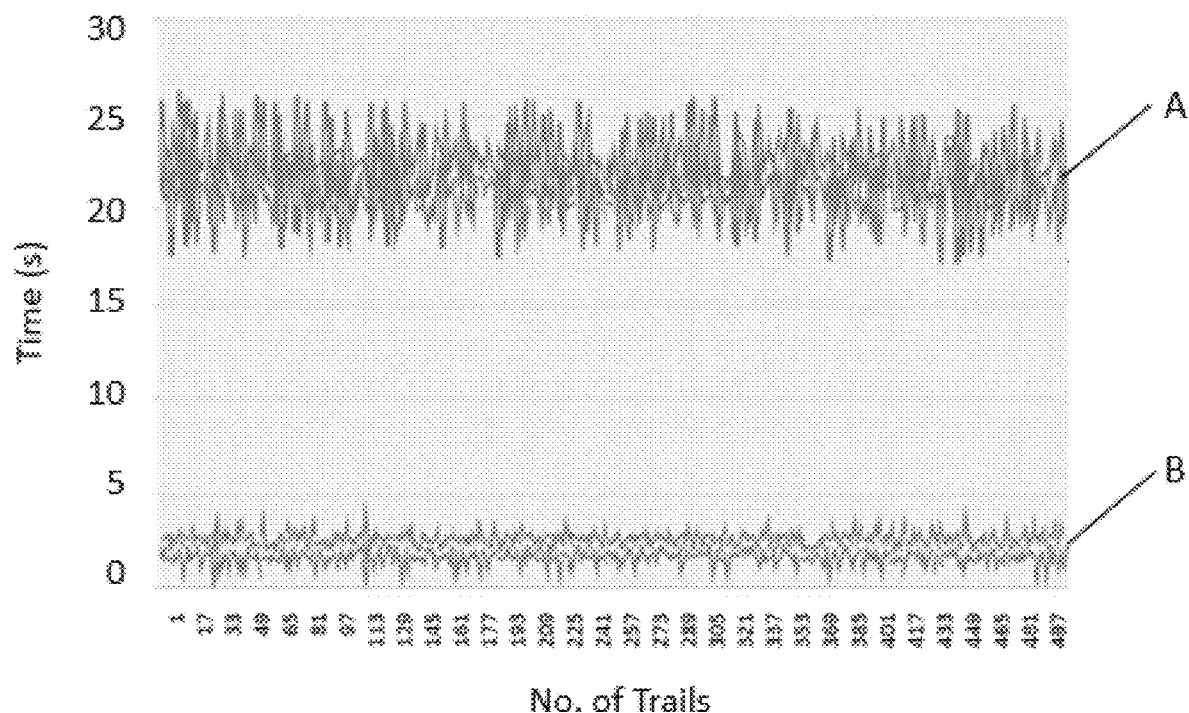
Figure 8B:
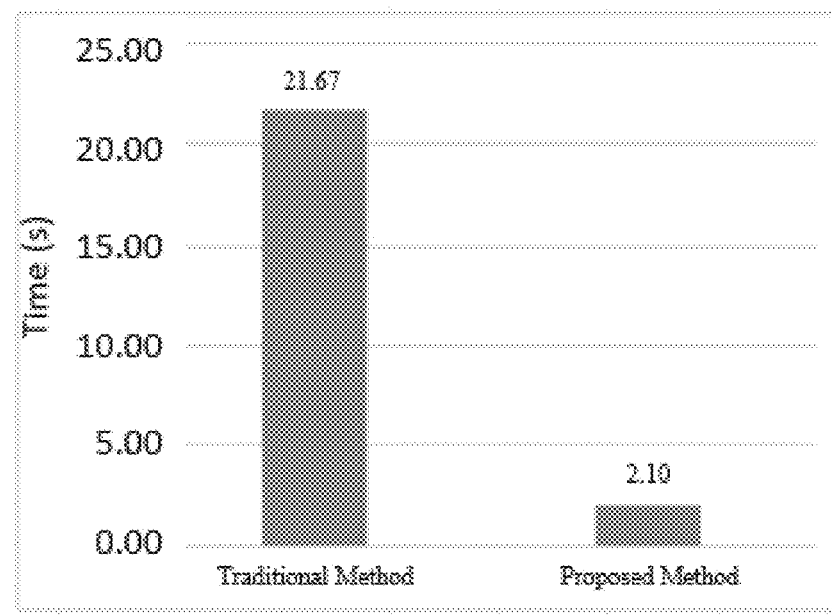
Figure 8C:
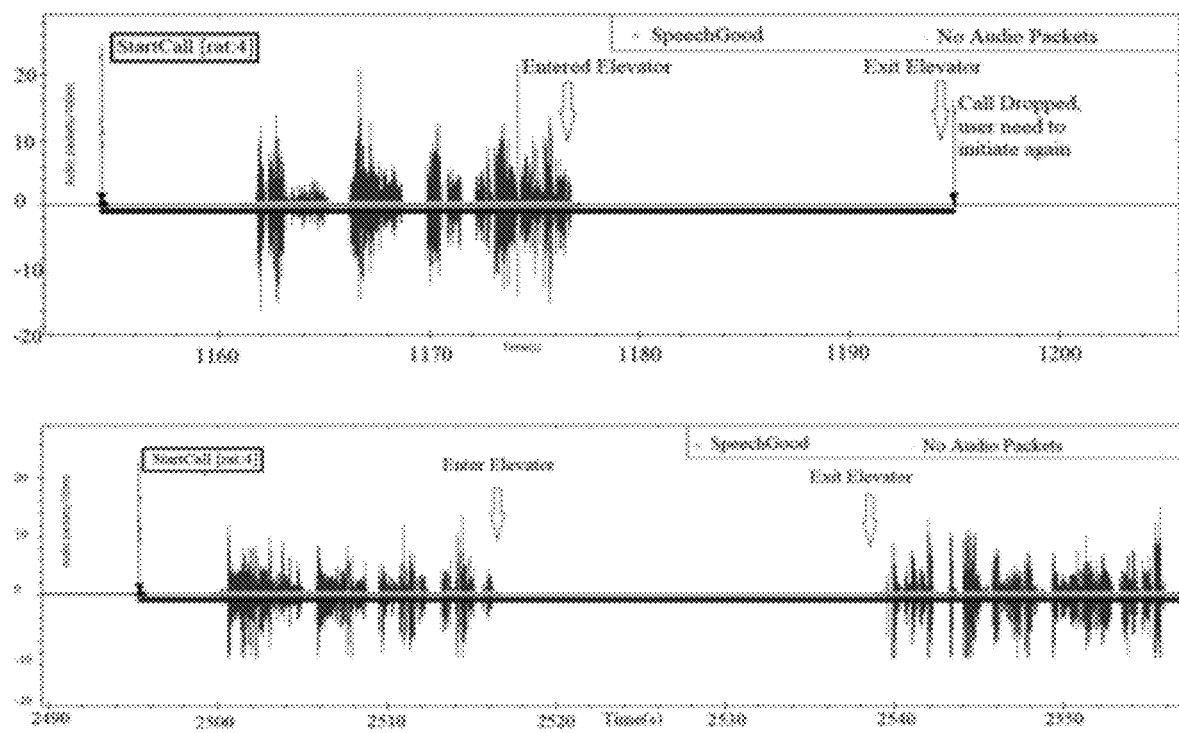

FIGS. 8A, 8B, and 8C illustrates call setup and call drop comparison between existing systems and the present invention;

It should be appreciated by those skilled in the art that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Figure 1A:
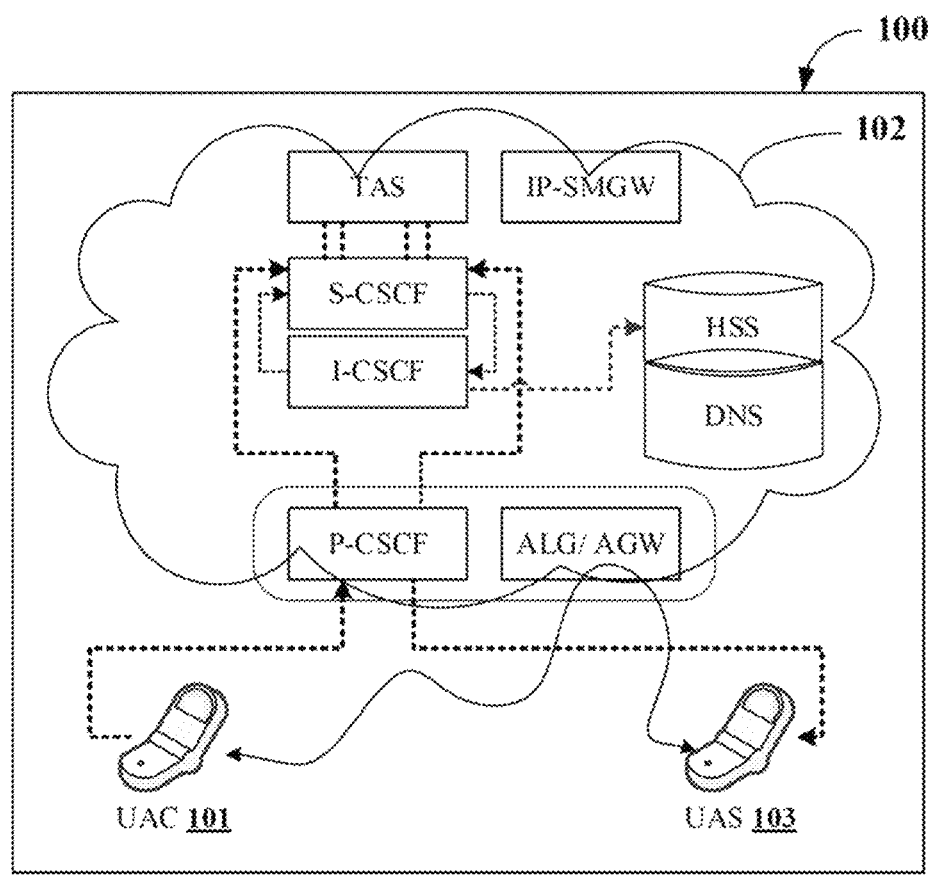
FIG. 1A illustrates existing VoLTE architecture.

FIG. 1A illustrates existing Voice over Long-Term Evolution (VoLTE) architecture 100 for a VoLTE communication between a User Agent Client (UAC) 101 and User Agent Server (UAS) 103 over an IP Multimedia System (IMS) network 102. The IMS network 102 is a standardised architectural framework for delivering Internet Protocol (IP) multimedia services. The IMS network 102 uses Session Initiation Protocol (SIP) as a core protocol. The SIP is a signaling protocol used for initiating, maintaining, and terminating real-time sessions that include voice, video, messaging applications, and the like. The UAC 101 is an entity that sends SIP request for initiating the session and receives SIP response. For example, the UAC 101 is a terminal associated with a sender in the VoLTE communication. The UAS 103 is an entity that receives the SIP request and sends the SIP response. For example, the UAS 103 is a terminal associated with a receiver in the VoLTE communication. Proxy Call Session Control Function (P-CSCF) acts as end user (also referred as UAC 101) entry point to the IMS network 102 for registration and call setup signaling messages. IMS Application-Level Gateway (ALG) is part of the P-CSCF and provides control of IMS Access Gateway (AGW) for media plane handling, monitoring and management of media flows, and the like. Serving Call Session Control Function (S-CSCF) acts as SIP server in the IMS network 102. The S-CSCF provides session management functionality and routes SIP messages between various endpoints.

Home Subscriber Server (HSS) stores subscriber's IMS profiles database including security parameters located in end user's Subscriber Identity Module (SIM). Interrogating Call Session Control Function (I-CSCF) interrogates the HSS and routes the SIP requests to appropriate S-CSCF. Domain Name System (DNS) assigns domain names and maps the names to Internet resources by designating authoritative name servers for each domain. A Telephony Application Server (TAS) is a component used in core network of a telecom network operator to provide telephony applications and additional multimedia functions. IP Short Message Gateway (IP-SMGW) is an IMS Application Server which handles SIP based messaging services for IMS subscribers.

Figure 1B:
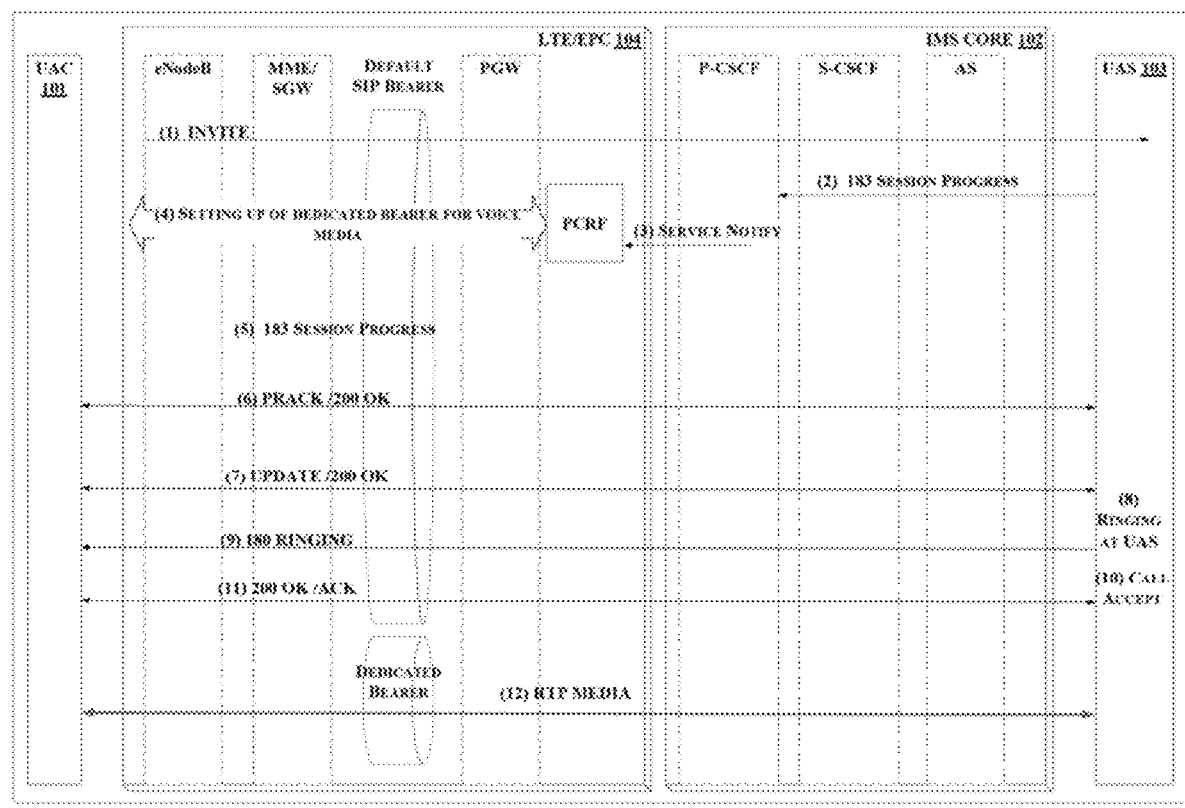
FIG. 1B shows a flow diagram illustrating an existing VoLTE call signaling flow in a VoLTE communication network.

FIG. 1B shows a flow diagram illustrating an existing VoLTE call signaling flow in a VoLTE communication network. The VoLTE architecture comprises a Long-Term Evolution (LTE)/Evolved Packet Core (EPC) network 104 and the IMS server 102. The LTE network 104 includes eNodeB, Mobility Management Entity (MME)/Serving Gateway (SGW), and Packet data network Gateway (PGW). The IMS server 102 includes the TAS, the P-CSCF, and the S-CSCF. The UAC 101 initiates the VoLTE call to communicate with the UAS 103 by sending SIP INVITE. The UAS 103 responds to the UAC 101 by sending 183 Session Progress notification through Policy and Charging Rules Function (PCRF) of the LTE network 104 for setting up bearer for voice media. Furthermore, the UAS 103 sends Provisional Response Acknowledgement (PRACK) along with 200 OK notification of codec selected to UAC 101. Upon completion of this process, the UAS 103 starts ringing and sends the notification of completion confirmation of setting up the bearer for voice media. The UAS 103 answers the call and sends the notification 200 OK acknowledgement, by which the session gets established. Real Time Transport Protocol (RTP) codes multimedia data streams such as audio or video, divides them into packets and transmit them over the IMS network 102. 200 OK is the response generated soon after a receiver at the UAS 103 answers the call. The RTP packets (conversations) start flowing from both the ends. In the figures and corresponding description of the present invention, the VoLTE communication network is considered as an example to explain the voice communication networks, for understanding purposes only and this should not be considered as limiting. The present disclosure is applicable for other voice communication networks such as Voice over New Radio (VoNR) with a similar implementation in which voice is packetized over Internet Protocol.

Embodiments of the present disclosure relate to a method of preventing call drop in a voice communication network, a terminal, and a server. A session is established for a voice call initiated between a first terminal and a second terminal. Media inactivity timers monitor inactivity of packet transmission when the voice call is active. The inactivity of packet transmission in a low-signal area causes timeout of the media inactivity timers. This leads to call drop. The present disclosure overcomes the problem by notifying the first and second terminals that the first terminal is entering the low-signal area. The media inactivity timers are disabled to avoid timeout for retaining the session, when a user associated with the first terminal is in the low-signal area. Network parameters associated with the first terminal are stored. Further, the first and second terminals are notified when the first terminal is exiting the low-signal area. The voice call is resumed on the same session using the stored network parameters. Hence, the user can control call status in the low-signal area, to avoid call drop. With such a pause-resume kind of feature, user experience is boosted. Further, network resources are saved since the voice call is resumed on the same session. Also, the network parameters are stored to avoid re-configuration of the network parameters when the user exits the low-signal area. When the session is released, the voice call is re-initiated on the new session based on the stored network parameters. This ensures that the call is not dropped even when the session is released. Hence, the user can continue the call when the user exists the low-signal area and experience is further enhanced. Further, this will avoid users associated with the first terminal and the second terminal calling together same time when re-attempting to make the call, which can lead call fail permanently.

Further embodiments of the present disclosure relate to a method of preventing call drop in a voice communication network, in which a first terminal supports dual Subscriber Identity Modules (SIMs). A first call is initiated between the first terminal and a second terminal. The first terminal may detect a second call on the second SIM from a third terminal. The parallel active calls or active call and internet data session on two different SIMs may lead to degradation of call quality and the call may eventually get dropped. In the present disclosure one or more media inactivity timers associated with the first call are disabled when the second call is detected on the second SIM. Furthermore, The network parameters associated with the first call are stored. The first call is resumed or re-initiated on the existing session or new session, respectively through quick service recovery using the stored network parameters.

Figure 2:
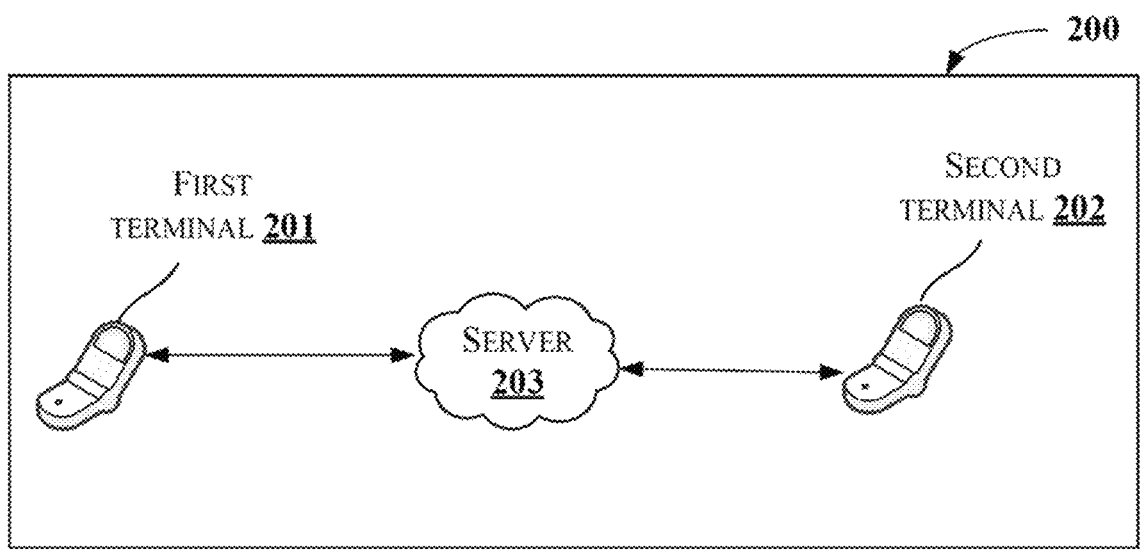
FIG. 2 illustrates an exemplary environment for preventing call drop in a voice communication network, in accordance with some embodiments of the present disclosure.

FIG. 2 illustrates an exemplary environment 200 for preventing call drop in a voice communication network, in accordance with some embodiments of the present disclosure. The exemplary environment 200 comprises a first terminal 201, a server 203, and a second terminal 202. The first terminal 201 may refer to a User Equipment (UE) associated with a sender. The sender may be a user initiating a VoLTE call to a receiver. The first terminal 201 is also referred as the UAC in the present description. The second terminal 202 may refer to a UE associated with the receiver. The receiver may be a user receiving the call from the sender. The second terminal 202 is also referred as the UAS in the present description. The server 203 is a IMS server. The server 203 uses the SIP for initiating, maintaining, and terminating sessions for the voice call between the first terminal 201 and the second terminal 202. The voice call initiated between the first terminal 201 and the second terminal 202 may be a voice call, video call, and the like. The first terminal 201 and the second terminal 202 may be a handheld device such as a smartphone associated with the sender and the receiver, respectively. The first terminal 201 and the second terminal 202 may be any computing device such as a laptop computer, a desktop computer, a Personal Computer (PC), a notebook, a smartphone, a tablet, e-book readers, a server, a network server, a cloud-based server, and the like. The terminologies associated with the VoLTE communication network in the present description are used for understanding purposes only and should not be considered as limiting. The voice call between the first terminal 201 and the second terminal 202 may drop due to various reasons. The call drop is defined as a fraction of calls which, due to technical reasons, were cut off before users had finished their conversational tone and before one of them had hung up. The present disclosure relates to preventing the call drop in the voice communication network.

Figure 3:
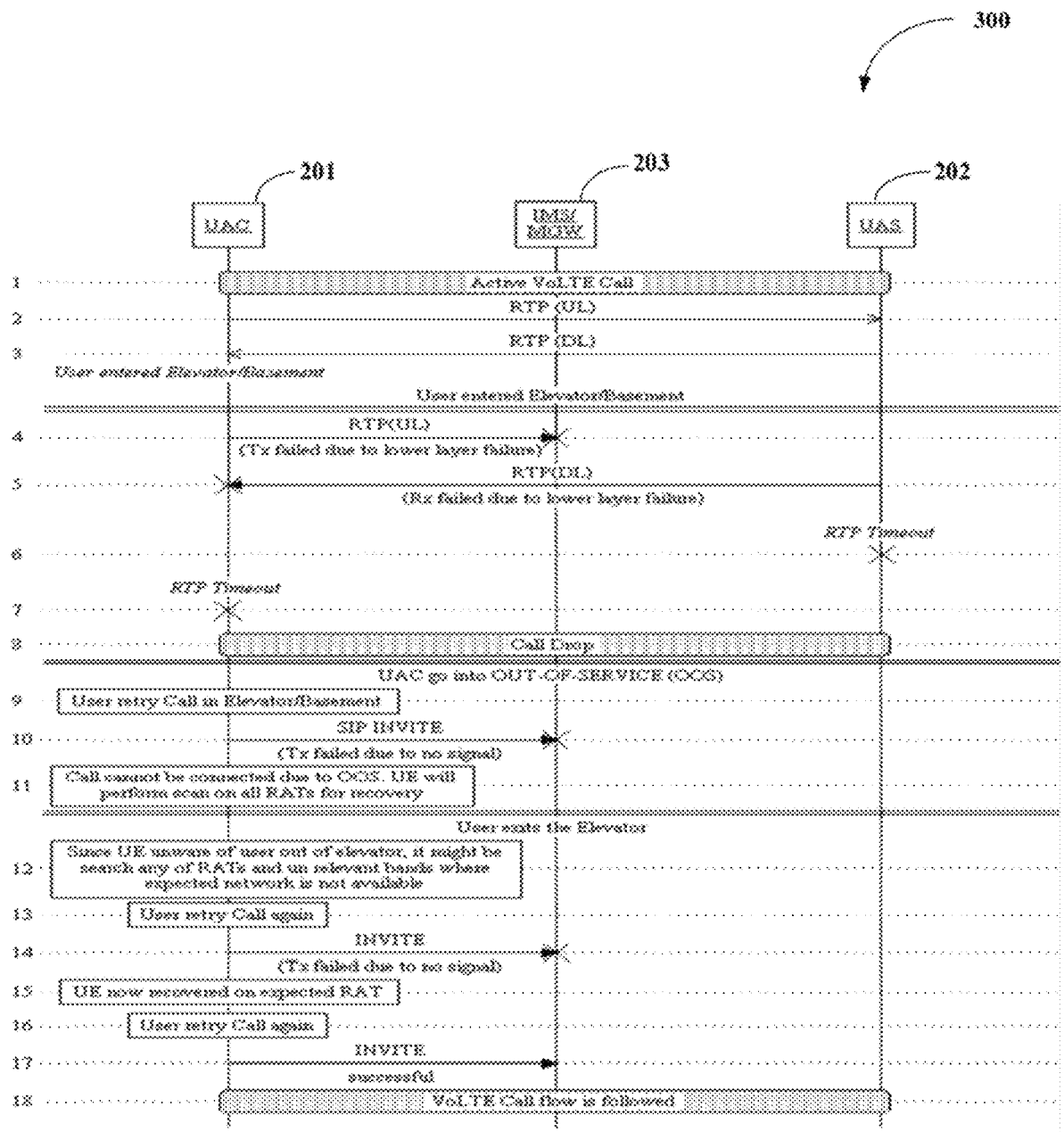
FIG. 3 shows a flow diagram illustrating call drop scenario in a voice communication network, in accordance with some embodiments of the present disclosure.

FIG. 3 shows a flow diagram 300 illustrating call drop scenario in the voice communication network, in accordance with some embodiments of the present disclosure. In FIG. 3, VoLTE communication is considered as an example. In step 1, the VoLTE call is active between the first terminal 201 and the second terminal 202 through the IMS server 203. The IMS server 203 has established a session for the VoLTE call between the first terminal 201 and the second terminal 202. The VoLTE call initiated between the first terminal 201 and the second terminal 202 may be a voice call, video call, and the like. In step 2, RTP packets are flowing from the first terminal 201 to the second terminal 202 on Uplink (UL) channel. RTP stands for Real-Time Transport Protocol used to code multimedia data streams such as audio or video, divide them into packets and transmit them over an IP network. At transport level, the RTP typically uses connectionless User Datagram Protocol (UDP). The RTP packets are flowing from the second terminal 202 to the first terminal 201 on Downlink (DL) channel. The RTP packets are coded multimedia packets such as voice/video packets i.e., the first terminal 201 and the second terminal 202 are exchanging voice/video packets. In step 3, a first user (sender) associated with the first terminal 201 enters a low-signal area such as elevator, basement, underground, and the like when the VoLTE call is active or in progress. The transmission and reception of the RTP packets fail due to non-availability of good signal conditions as shown in step 4 and 5. The RTP packets are not received at the second terminal 202. Media inactivity timer associated with the second terminal 202 is activated. For example, the media inactivity timer is a RTP timer. The media inactivity timer is used to indicate that the RTP packets have stopped flowing for configured amount of time or silent suppression packets are not sent. When the RTP packets stop flowing for the configured amount of time, RTP timeout occurs. In an example, the RTP timeout may occur after 10 seconds or 20 seconds. Since, the RTP packets are not received at the second terminal 202, the RTP timeout occurs at the second terminal 202 as shown in step 6. Similarly, the RTP packets are not received at the first terminal 201, which causes the RTP timeout at the first terminal 201. This leads to call drop when the first user associated with the first terminal 201 enters the low-signal area i.e., the first terminal 201 is in Out-of-Service (OOS) area. Further, the first user may continue to attempt the call by transmitting the SIP INVITE to the second terminal 202, which fails due to non-availability of good signal as shown in step 9 and step 10. While the first terminal 201 is in no service state, the first terminal 201 reinitiates protocol procedures to recover lost signal as shown in step 11. Further, recovery depends on network conditions, availability of different Radio Access technology (RAT). As part of recovery, the first terminal 201 may be searching for network on different RATs and frequencies. Also, during recovery, if user exits the elevator, any call attempt by the first user will also lead to failure, as UE has not yet recovered. The said operations are shown in step 12 and step 13. Further, in step 14, the first terminal 201 may detect a different network or RAT depending on the RAT and the frequency scanned at that moment. Since it is a fresh registration and camping attempt, the first terminal 201 might even encounter a reject from network and further initiate protocol procedures as per the reject handling. This would further delay the recovery. Finally, the first terminal 201 recovers on the RAT at step 15. The first user associated with the first terminal 201 establishes the VoLTE call with the second terminal 202 as shown in steps 16-18. Several call attempts by the first user in the low-signal area leads to bad user experience and is annoying to both the first user and second user (receiver).

Figure 4A:
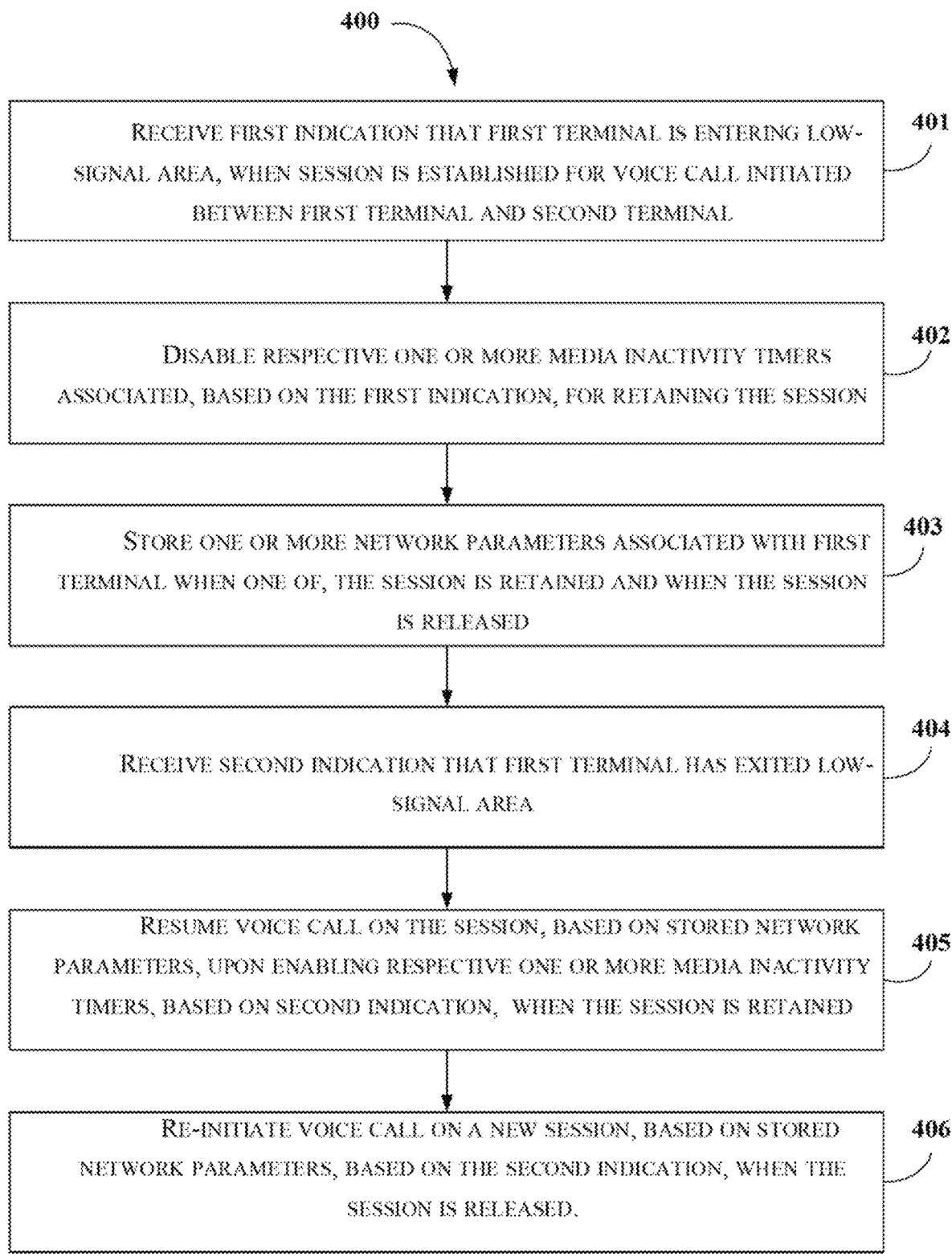
FIG. 4A shows an exemplary flow chart illustrating method steps for preventing call drop in a voice communication network, in accordance with some embodiments of the present disclosure.

FIG. 4A shows an exemplary flow chart illustrating method steps for preventing call drop in the voice communication network, in accordance with some embodiments of the present disclosure. As illustrated in FIG. 4A, the method 400 may comprise one or more steps. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step 401, the first terminal 201 and the second terminal 202 receives a first indication that the first terminal 201 is entering the low-signal area. The voice call is active between the first terminal 201 and the second terminal 202. A session is established for the voice call initiated between the first terminal 201 and the second terminal 202. The first terminal 201 may enter the low-signal area when the voice call is active. For example, the low-signal area may be elevator. The first user associated with the first terminal 201 may enter the elevator when in the voice call with the second user associated with the second terminal 202. In an embodiment, the first terminal 201 may receive the first indication from a user interface of the first terminal 201. For example, an option may be provided on a dialer window on the first terminal 201 along with other call options such as speaker, mute, hold, record, and the like. The option may be displayed as "Elevator mode ON". The option may be displayed in any other forms. For example, an elevator icon may be displayed. In another example, a low-signal icon may be displayed. The first user may select the option to provide the first indication to the first terminal 201. In another embodiment, the first indication may be generated automatically based on different sensor and peripheral inputs-location services over Global Positioning System (GPS), barometer, and other vertical location detectors. Referring to flow diagram 407, steps 1-3 show the active call established between the first terminal 201 and the second terminal 202 and transmission and reception of the RTP packets at the first terminal 201 and the second terminal 202. At step 4, the first terminal 201 receives the first indication that the first terminal 201 is entering the low-signal area.

In an embodiment, the second terminal 202 may receive the first indication that the first terminal 201 is entering the low-signal area, from the first terminal 201 via the server 203. The voice communication network may be the VoLTE communication network. The server 203 (IMS server) supports SIP INFO method. The SIP INFO method is designed to transmit application-level control information along the SIP signaling path. The first indication may be provided by the first terminal 201 to the second terminal 202 using a SIP INFO message. For example, the first indication may be set as content type application/text message and information such as "I'm entering a low-signal area". The text message is included in the SIP INFO message. Referring to the flow diagram 407, step 6 shows the first indication provided to the second terminal 202 by the first terminal 201 using the SIP INFO method.

Figure 4B:
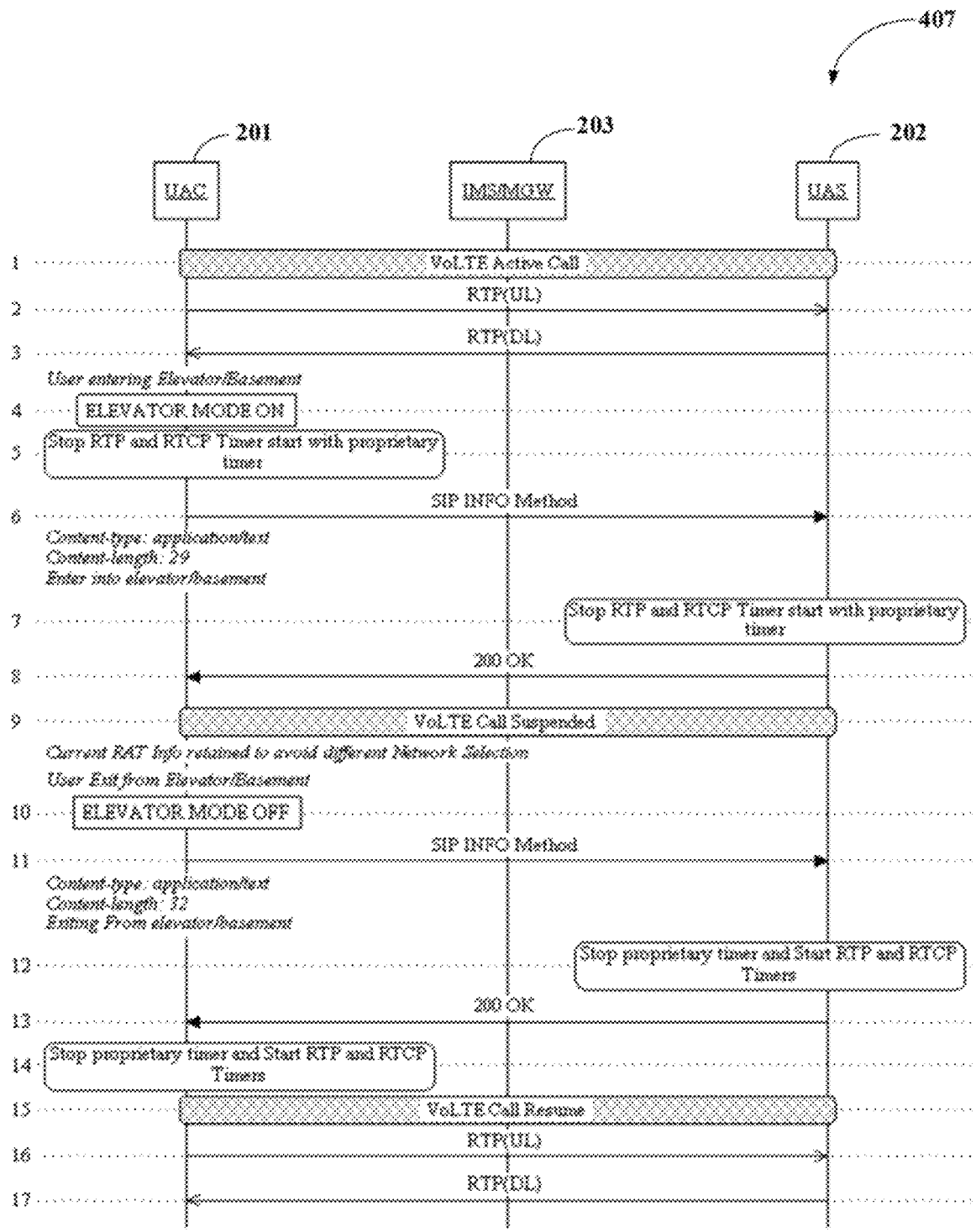
FIGS. 4B-4C shows an exemplary flow diagram illustrating method steps for preventing call drop in a voice communication network, in accordance with some embodiments of the present disclosure.

Referring back to FIG. 4A, at step 402, the first terminal 201 and the second terminal 202 disables respective one or more media inactivity timers, based on the first indication, for retaining the session. The first terminal 201 and the second terminal 202 may be associated with one or more media inactivity timers to monitor inactivity of the packet transmission during the active voice call. The one or more media inactivity timers may be RTP timer and Real-time Transport Control Protocol (RTCP) timer. RTCP is used to send control packets to participants in a call. The primary function of the RTCP is to provide feedback on the quality of service being provided by the RTP. When the first terminal 201 is in the low-signal area, the RTP packets are not transmitted or received which causes RTP/RTCP timeout. The timeout leads to release of the session and hence call drop. In the embodiment of the present disclosure, the one or more media inactivity timers associated with the first terminal 201 and the second terminal 202 are disabled, for retaining the session. Further, monitoring timers are implemented in the first terminal 201 and the second terminal 202. The one or more media inactivity timers are disabled for a time duration of the respective monitoring timer. The respective monitoring timers are enabled when the respective one or more media inactivity timers are disabled. For example, the time duration may be a minute. Referring again to the flow diagram 407 of FIG. 4B, at step 5, the media inactivity timers are disabled, and the monitoring timer (referred as proprietary timer in Figures) is enabled at the first terminal 201. Similarly, the media inactivity timers are disabled, and the monitoring timer (referred as proprietary timer in Figures) is enabled at the second terminal 202, upon receiving the first indication as shown in step 7. The steps 5-7 may occur in any order. For example, the first terminal 201 may disable the media inactivity timers and enable the monitoring timer, and then transmit the SIP INFO message to the second terminal 202. The second terminal 202 may disable the one or more media inactivity timers and enable the monitoring timer, upon receiving the SIP INFO message. In another example, the first terminal 201 may first transmit the SIP INFO message to the second terminal 202. Then, the first terminal 201 and the second terminal 202 may disable respective media inactivity timers and enable respective monitoring timers. The second terminal 202 may transmit 200 OK response after disabling the one or more media inactivity timers and enabling the monitoring timer. The session is retained, and the voice call is suspended when the first terminal 201 is in the low-signal area as shown in step 9.

Referring back to FIG. 4A, at step 403, the first terminal 201 stores one or more network parameters associated with the first terminal 201 and the second terminal 202 when one of, the session is retained and when the session is released. The one or more network parameters may comprise a Registered Public Land Mobile Network (RPLMN), a Radio Access Technology (RAT), and a frequency of respective camped cell associated with the first terminal 201 and the second terminal 202. Each of the first terminal 201 and second terminal 202 is camped on a cell to access the voice communication network, before entering the low-signal area. The RPLMN is a Public Land Mobile Network (PLMN) on which a user terminal has performed a location registration successfully. The RAT is the underlying physical connection method for a radio-based communication network. For example, the first terminal 201 and the second terminal 202 may be connected to LTE network. Multiple frequencies or frequency bands may be associated with each RAT. The first terminal 201 and the second terminal 202 typically constantly searches for RAT and all supported bands to connect to the voice communication network. The first terminal 201 and the second terminal 202 stores the one or more network parameters to avoid different network selection and speedy recovery. Also, delay and processing complexity in searching the RAT and the frequency is reduced. Referring again to the flow diagram 409, the first terminal 201 and the second terminal 202 stores the one or more network parameters when the session is retained.

Figure 4C:
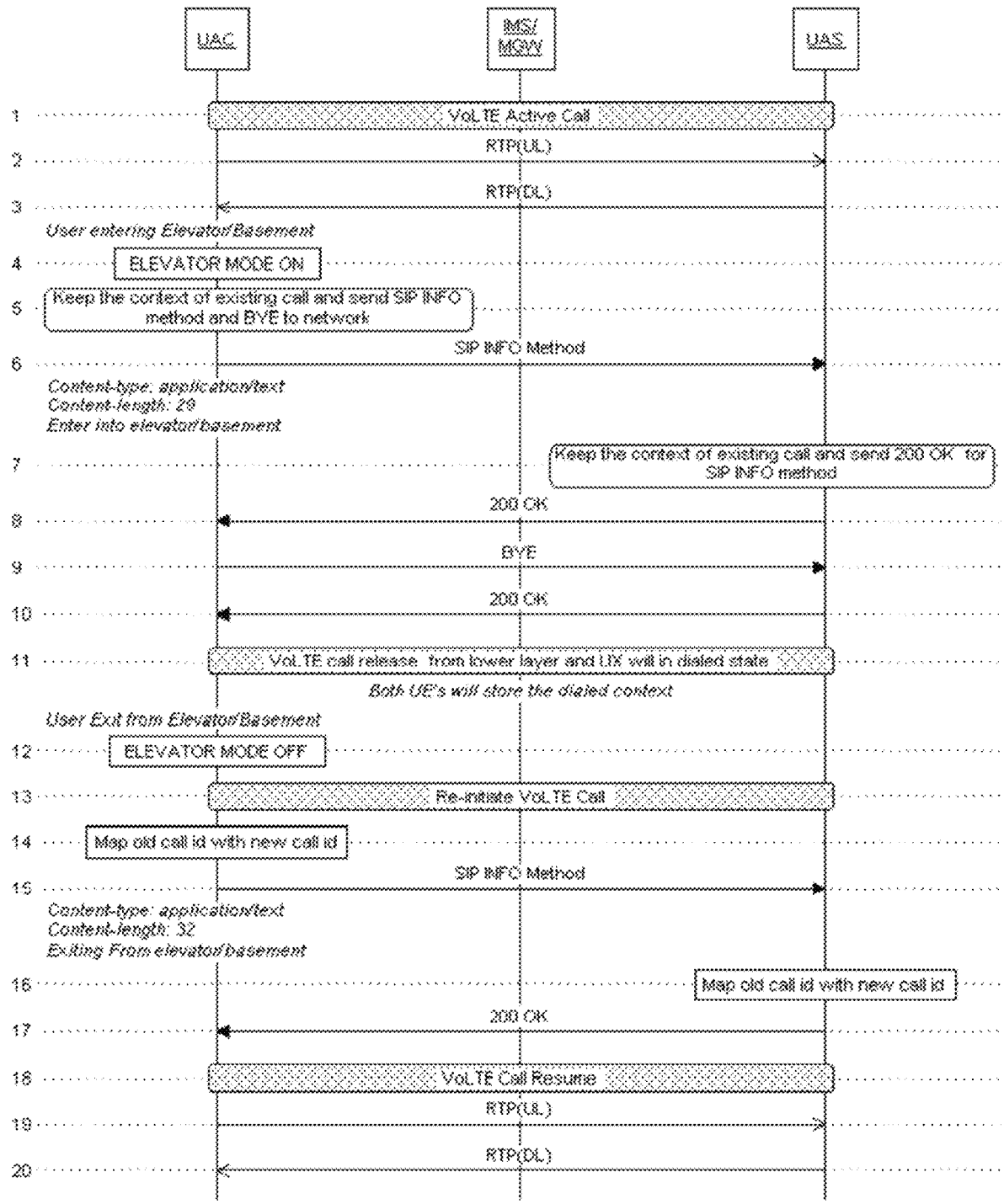

In an embodiment, the session may be released by the first terminal 201 or the server 203. For example, the server 203 may release the session upon detecting inactivity of the packet transmission. The server 203 may remove bearer and the first terminal 201 may recover services by making several call attempts and connect to different RAT. To avoid this, call information associated with the voice call is stored by the first terminal 201 and the second terminal 202, prior to the session is released. The dialer session and display on the UE are also maintained for the user to know that session and the call is maintained. The call information is stored to re-initiate the voice call with same contact. Flow diagram 408 of FIG. 4C illustrates a scenario of session release by the first terminal 201. Steps 1-4 illustrate the active voice call between the first terminal 201 and the second terminal 202 and the first terminal 201 entering the low-signal area. Steps 1-4 are not explained in detail again. As shown in steps 5-7, the call information is stored at the first terminal 201 and the second terminal 202. In step 8, the second terminal 202 sends 200 OK response upon storing the call information. The first terminal 201 releases the session using SIP BYE method as shown in step 9. The SIP BYE method is used to terminate an established session in the VoLTE communication network. At step 11, the session is released from lower layers of the voice communication network. However, the dialer window on the user interface (UX) will be in a same state. This improves the user experience since a pause-resume kind of experience is provided to the first user and the second user, when the session is released and re-established in the lower layers of the voice communication network.

Referring back to FIG. 4A, at step 404, the first terminal 201 and the second terminal 202 receives a second indication that the first terminal 201 has exited the low-signal area. For example, the first user associated with the first terminal 201 may exit the elevator. In an embodiment, the first terminal 201 may receive the second indication from the user interface of the first terminal 201. For example, an option may be provided on a dialer window on the first terminal 201. The option may be displayed as "Elevator mode OFF". In another example, the option may be displayed as "Resume call". The option may be displayed in any other forms. The first user may select the option to provide the second indication to the first terminal 201. In another embodiment, the second indication may be generated automatically based on different sensor and peripheral inputs-location services over Global Positioning System (GPS), barometer, and other vertical location detectors. Referring to flow diagram 407 of FIG. 4B, step 10 shows the second indication received by the first terminal 201 that the first terminal 201 has exited the low-signal area. Similarly, step 12 in the flow diagram 408 shows the second indication received by the first terminal 201.

In an embodiment, the second terminal 202 may receive the second indication that the first terminal 201 has exited the low-signal area, from the first terminal 201 via the server 203. The second indication may be provided by the first terminal 201 to the second terminal 202 using the SIP INFO message. For example, the second indication may be a text message such as "I'm exiting from a low-signal area". The text message may be included in the SIP INFO message. Referring to the flow diagram 407, step 11 shows the second indication provided to the second terminal 202 by the first terminal 201 using the SIP INFO method.

Referring back to FIG. 4A, at step 405, the first terminal 201 and the second terminal 202 may resume the voice call on the session, based on the stored network parameters, when the session is retained. When the first terminal 201 exits the low-signal area, the first terminal 201 enables the one or more media inactivity timers. The first terminal 201 resumes the voice call on the same session. The stored network parameters are used for quick recovery and the first terminal 201 is connected to the same RPLMN, RAT and frequency. Further, the second terminal 202 resumes the voice call on the same session upon receiving the SIP INFO message from the first terminal 201. The first terminal 201 and the second terminal 202 disables the respective monitoring timers. Referring to the flow diagram 407 of FIG. 4B, at step 12, the second terminal 202 disables the one or more media inactivity timers and enables the monitoring timer associated with the second terminal 202. At step 13, the second terminal 202 sends a 200 OK response to the first terminal 201. AT step 14, the first terminal 201 enables the one or more media inactivity timers and disables the monitoring timer associated with the first terminal 201. The voice call is resumed using the stored network parameters as shown in step 15. The first terminal 201 and the second terminal 202 will continue the call and transmit the RTP packets as shown steps 16 and 17. Hence, the first user and the second user can resume the same call by selecting pause-resume options on respective user interface. This improves the user experience. Also, call attempts by the first user and the second user in the low-signal area is avoided.

In an example, the first user may select the option to indicate entering in the low-signal area. The voice call may be suspended by disabling the one or more media inactivity timers and enabling the monitoring timers at the first terminal 201 and the second terminal 202. The first terminal 201 may exit the low-signal area. The first user associated with the first terminal 201 may not select the resume option (second indication) to indicate exiting the low-signal area. The one or more media inactivity timers may remain in disabled state. To avoid this, the monitoring timer is implemented. When the one or more media inactivity timers remain in disabled state, the one or more media inactivity timers are enabled after the time duration of the monitoring timer. For example, the time duration may be two minutes. The one or more media inactivity timers may be enabled after two minutes, when the second indication is not received from the first user.

Referring back to FIG. 4A, at step 406, the first terminal 201 and the second terminal 202 re-initiates the voice call on a new session, based on the stored network parameters, when the session is released. The first terminal 201 and the second terminal 202 may re-initiate the call with the same contact on a new session, using the stored call information. Each of the first terminal 201 and the second terminal 202 obtains a first call Identity (ID) associated with the session. The call information may comprise a name and a mobile number associated with the first user along with the first call ID. Further, a second call ID is assigned to the new session. The information related to the session and the new session may be mapped based on respective call IDs to re-initiate the voice call with the same contact. Further, the first terminal 201 may include SIP replaces header to indicate the second terminal 202 about re-initiating the call on the new session. The SIP replaces header is used to logically replace an existing SIP dialog with a new SIP dialog. On receiving the SIP INVITE message, the second terminal 202 checks the SIP replaces header and maps the information related to the session and the new session based on the respective call IDs. The voice call is re-initiated on the new session. Referring again to the flow diagram 408, steps 13-18 illustrate re-initiating the voice call on the new session by mapping the information related to the session and the new session based on the respective call IDs. The first terminal 201 and the second terminal 202 will continue the call and transmit the RTP packets as shown steps 19 and 20.

Figure 5A:
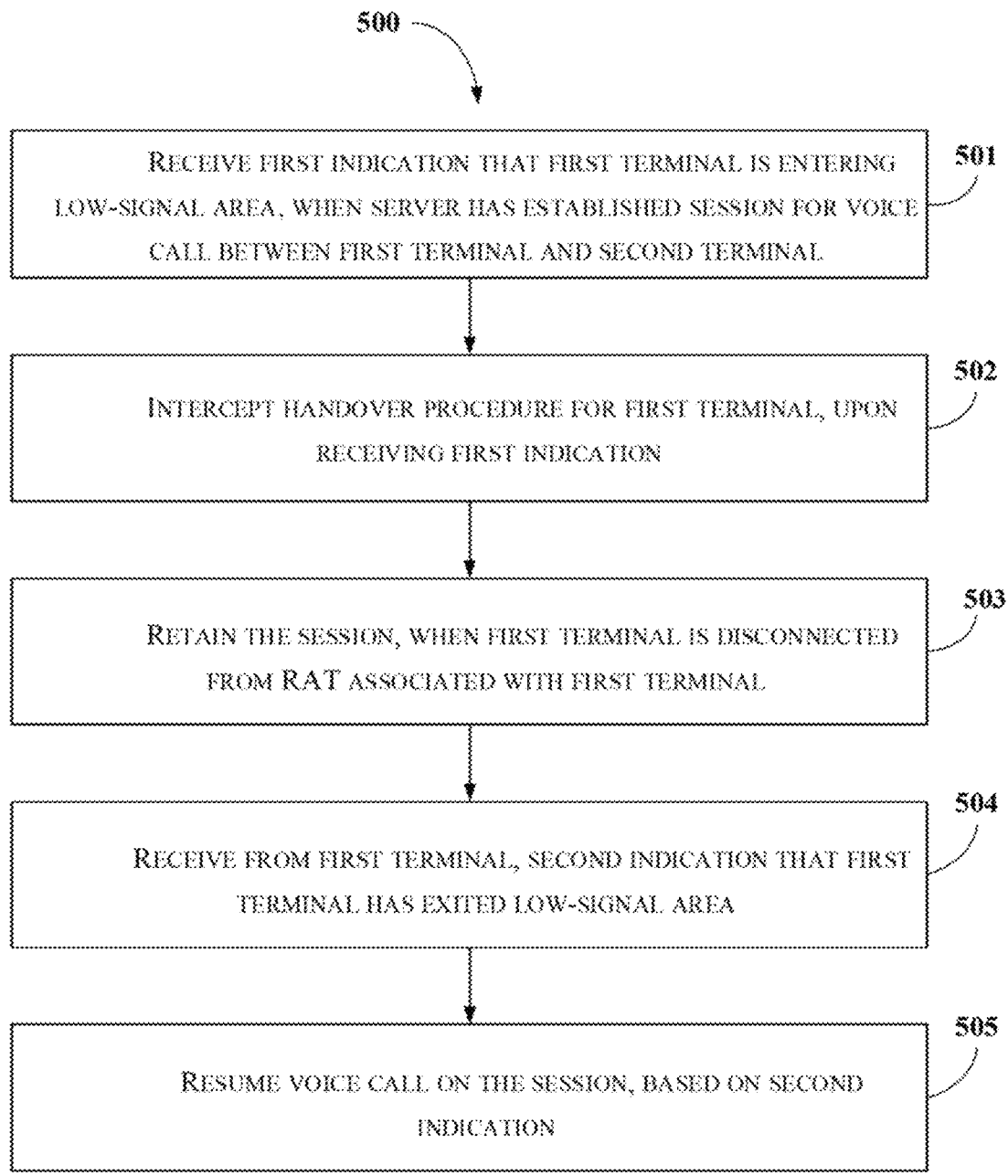
FIG. 5A shows an exemplary flow chart illustrating method steps for preventing call drop in the voice communication network, in accordance with some embodiments of the present disclosure.

Figure 5A shows an exemplary flow chart illustrating method steps for preventing call drop in the voice communication network, in accordance with some embodiments of the present disclosure. As illustrated in FIG. 5A, the method 500 may comprise one or more steps. The method 500 may be described in the general context of computer executable instructions. Generally, computer executable instructions can include routines, programs, objects, components, data structures, procedures, modules, and functions, which perform particular functions or implement particular abstract data types.

The order in which the method 500 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Figure 5B:
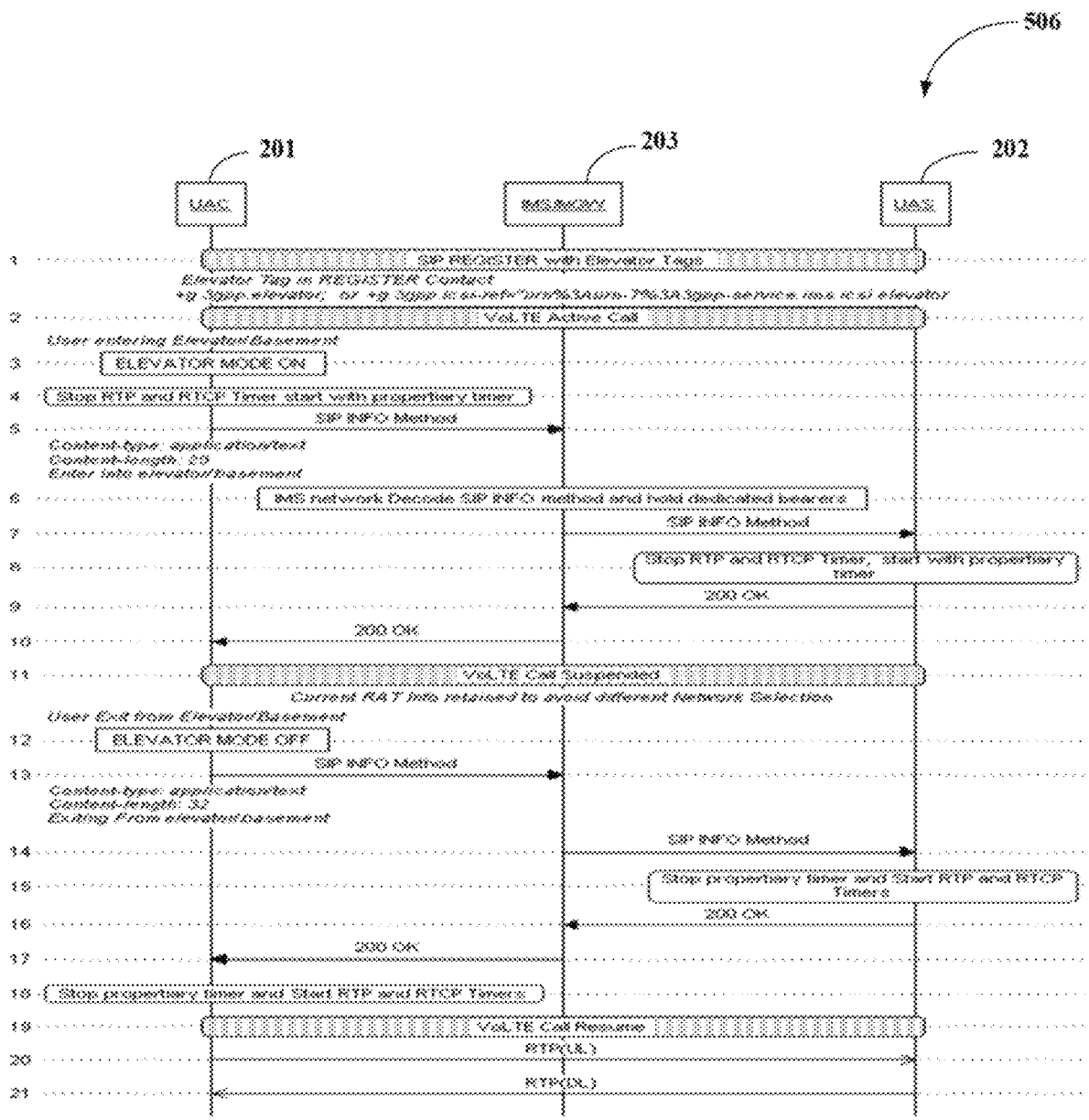
FIG. 5B shows an exemplary flow diagram illustrating method steps for preventing call drop in a voice communication network, in accordance with some embodiments of the present disclosure.

At step 501, the server 203 receives the first indication that the first terminal 201 is entering the low-signal area, from the first terminal 201. The server 203 has established a session for the voice call between the first terminal 201 and the second terminal 202. The server comprises one or more processors configured to perform steps illustrates in FIG. 5A. A new IMS feature tag may be supported by the server 203. For example, the IMS feature tag may be called as "Elevator mode". The first terminal 201 may add the said IMS feature tag in contact header of SIP register message during IMS registration procedure. The SIP register message is used to create bindings between addresses-of-record (AORs) and contact addresses where the first terminal 201 can be reached. When the server 203 supports the IMS feature, the server 203 will include the IMS feature tag in SIP register response. This confirms the support of the feature between terminal 201 and the server 203. During the call, when the first terminal 201 receives the first indication due to moving to the low-signal area, the first terminal 201 disables the one or more media inactivity timers and enables the monitoring timer. The first terminal 201 transmits the SIP INFO message to the server 203. The SIP INFO message includes the IMS feature tag and payload. The server 203 transmits the SIP INFO message to the second terminal 202. Referring to flow diagram 506 of FIG. 5B, step 1 shows the IMS registration procedure and inclusion of the IMS feature tag in the contact header of the SIP REGISTER message. At step 2, the voice call is active between the first terminal 201 and the second terminal 202. At step 3, the first terminal 201 enters the low-signal area. At step 4, the first terminal 201 disables the one or more media inactivity timers and enables the monitoring timer. At step 5, the first terminal 201 sends the SIP INFO message to the server 203.

Referring back to FIG. 5A, at step 502, the server 203 intercepts a handover procedure for the first terminal 201, upon receiving the first indication. The server 203 holds dedicated bearers upon receiving the first indication. Further, the server 203 may intercept the handover procedure. The handover procedure may be Single Radio Voice Call Continuity (SRVCC)/Inter Radio Access Technology (IRAT) procedure. SRVCC is a scheme that enables Inter RAT handover as well as a handover from packet data to circuit switched data voice calls. This will ensure that the first terminal 201 is not connected to a different RAT when the call is resumed. Referring again to the flow diagram 506 of FIG. 5B, at step 6, the server 203 decodes the SIP INFO message and holds the dedicated bearers.

Referring back to Figure SA, at step 503, the server 203 retains the session, when the first terminal 201 is disconnected from the RAT associated with the first terminal 201. The server 203 may disable media inactivity timers associated with the server 203 for large value to avoid call drop. Further, the server 203 may transmit the SIP INFO message to the second terminal 202. The second terminal 202 may disable the one or more media inactivity timers and enable the monitoring timer associated with the second terminal 202. Referring again to the flow diagram 506 of FIG. 5B, at step 7, the server 203 transmits the SIP INFO message to the second terminal 202. At step 8, the second terminal 202 disables the one or more media inactivity timers and enables the monitoring timer. At step 9, the second terminal 202 transmits a 200 OK response to the server 203. At step 10, the server 203 forwards the 200 OK response to the first terminal 201. At step 11, the voice call is suspended.

Referring back to Figure SA, at step 504, the server 203 receives the second indication that the first terminal 201 has exited the low-signal area, from the first terminal 201. The first terminal 201 may receive the second indication that the first terminal 201 has exited the low-signal area. The first terminal 201 may transmit the second indication in form of the SIP INFO message to the server 203. The server 203 may transmit the SIP INFO message to the second terminal 202. Referring to the flow diagram 506 of FIG. 5B, at step 12, the first terminal 201
receives the second indication that the first terminal 201 has exited the low-signal area. At step 13, the first terminal 201 transmits the SIP INFO message to the server 203. At step 14, the server 203 transmits the SIP INFO message to the second terminal 202.

Referring back to Figure SA, at step 505, the server 203 resumes the voice call on the session, based on the second indication. The first terminal 201 and the second terminal 202 enables respective one or more media inactivity timers and disable respective monitoring timer upon receiving the second indication. The voice call is resumed. Referring to the flow diagram 506 of FIG. 5B, at step 15, the second terminal 202 enables the one or more media inactivity timers and disables the monitoring timer. At step 16 and 17, the second terminal 202 transmits the 200 OK response to the first terminal 201 via the server 203. At step 18, the first terminal 201 enables the one or more media inactivity timers and disables the monitoring timer. At step 19, the voice call is resumed. At step 19 and 20, the first terminal 201 and second terminal 202 transmit the RTP packets and continue with the voice call.

Figure 5C:
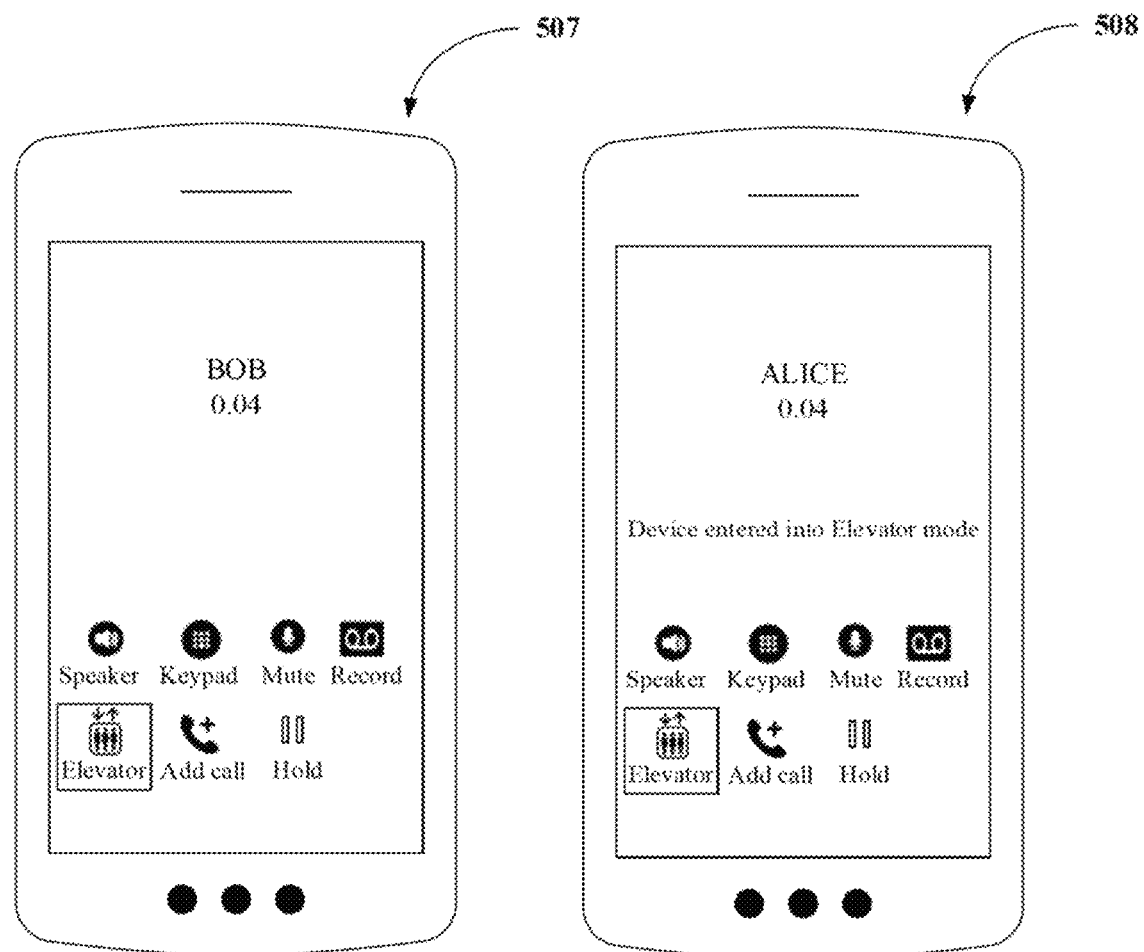
FIG. 5C shows exemplary user interfaces of user terminals for preventing call drop in a voice communication network, in accordance with some embodiments of the present disclosure.

Reference is now made to FIG. 5C illustrating changes in user interface (UX) of the first terminal 201 and the second terminal 202. 507 shows the UX of the first terminal 201. An option to indicate the first terminal 201 entering the low-signal area is provided along with other options on the dialer window. For example, the option is displayed as "Elevator" with elevator icon. The first user selects the option. 508 shows the UX of the second terminal 202. An additional text "Device entered into Elevator mode" may be displayed on the UX of the second terminal 202. Further, a tone may be played on the second terminal 202 to indicate the first terminal 201 in the low-signal area. For example, an elevator tone may be played.

Figure 6A:
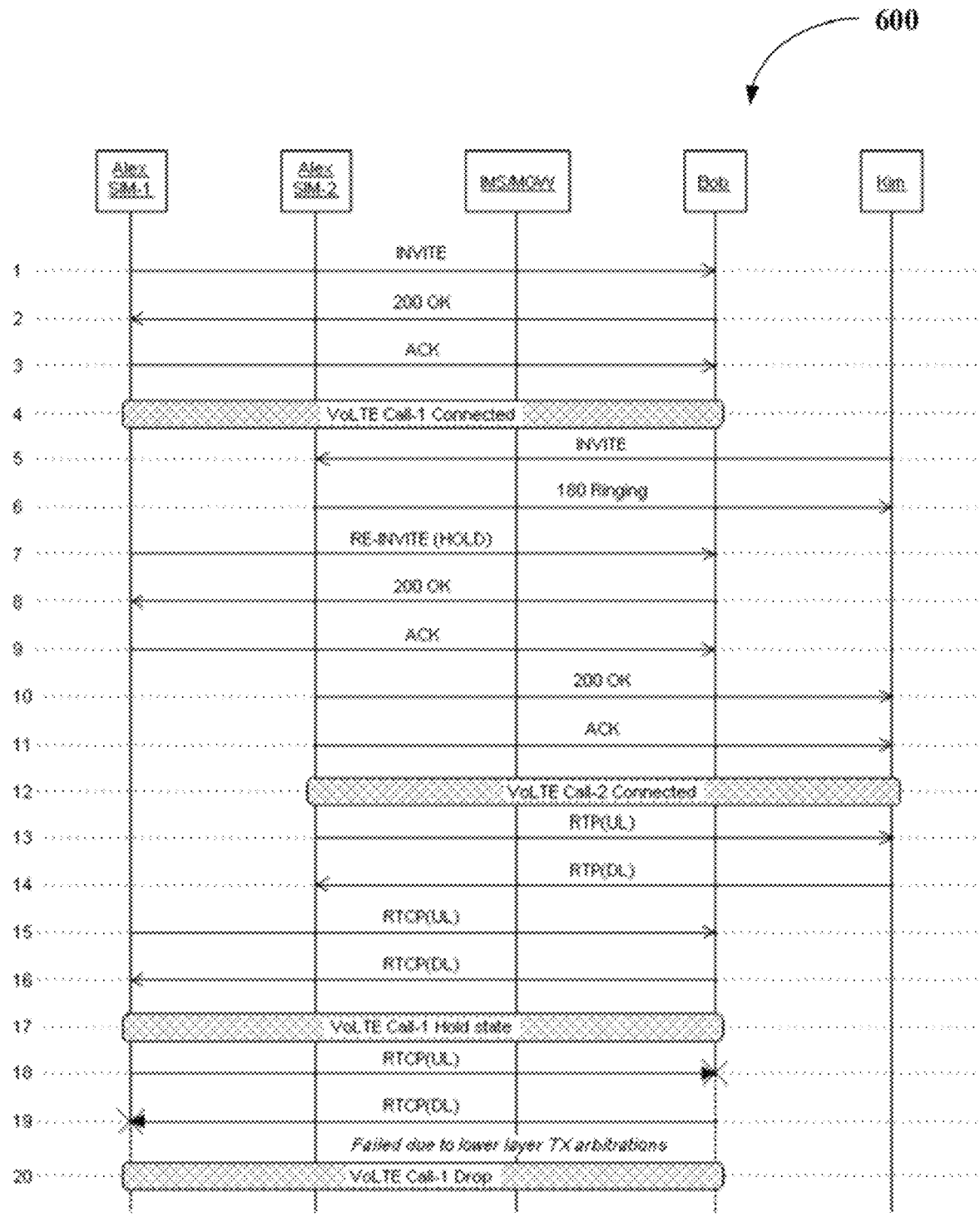
FIG. 6A shows a flow diagram illustrating call drop scenario in a voice communication network, in accordance with some embodiments of the present disclosure.

FIG. 6A shows a flow diagram 600 illustrating call drop scenario in the voice communication network, in accordance with some embodiments of the present disclosure. In an embodiment, the first terminal 201 may comprise a first Subscriber Identity Module (SIM) and a second SIM. The first terminal 201 may be associated with the first user named "Alex". Steps 1-4 shows the first terminal 201 establishing a first call with a second terminal 202 using the first SIM. A session is established for the first call between the first terminal 201 and the second terminal 202. A second user named "Bob" is associated with the second terminal 202. At steps 5 and 6, the first terminal 201 receives a second call from a third user named "Kim" associated with a third terminal. The first terminal 201 accepts the second call. At steps 7-9, the second user is kept on-hold by sending SIP RE-INVITE message to the second terminal 202. At steps 10-14, the second call is established on the second SIM between the first terminal 201 and a third terminal and the RTP packets are transmitted. Steps 15-17 illustrates the first call maintained on-hold by transmitting and receiving RTCP packets. For example, the RTCP packets may be silent suppression packets. The first terminal 201 may be a Dual Reception Dual Standby (DRDS)/Dual Receive Dual Volte Dual Standby (DR-DVDS). DRDS devices support dual reception for simultaneous downlink reception but share single transmission for uplink. Since there are two parallel active connections (first call and second call), users at each terminal face frequent problems with either quality of the active call or call drop of active/held call. When the first call is on-hold on the first SIM the voice quality of active call on the second SIM is degraded. This is due to frequent Transmission (TX) arbitration for RTCP packet transfer. This problem may increase in the low-signal areas, since TX arbitration may further increase between the two SIMs. This may lead to first call drop as shown in steps 18-20.

Figure 6B:
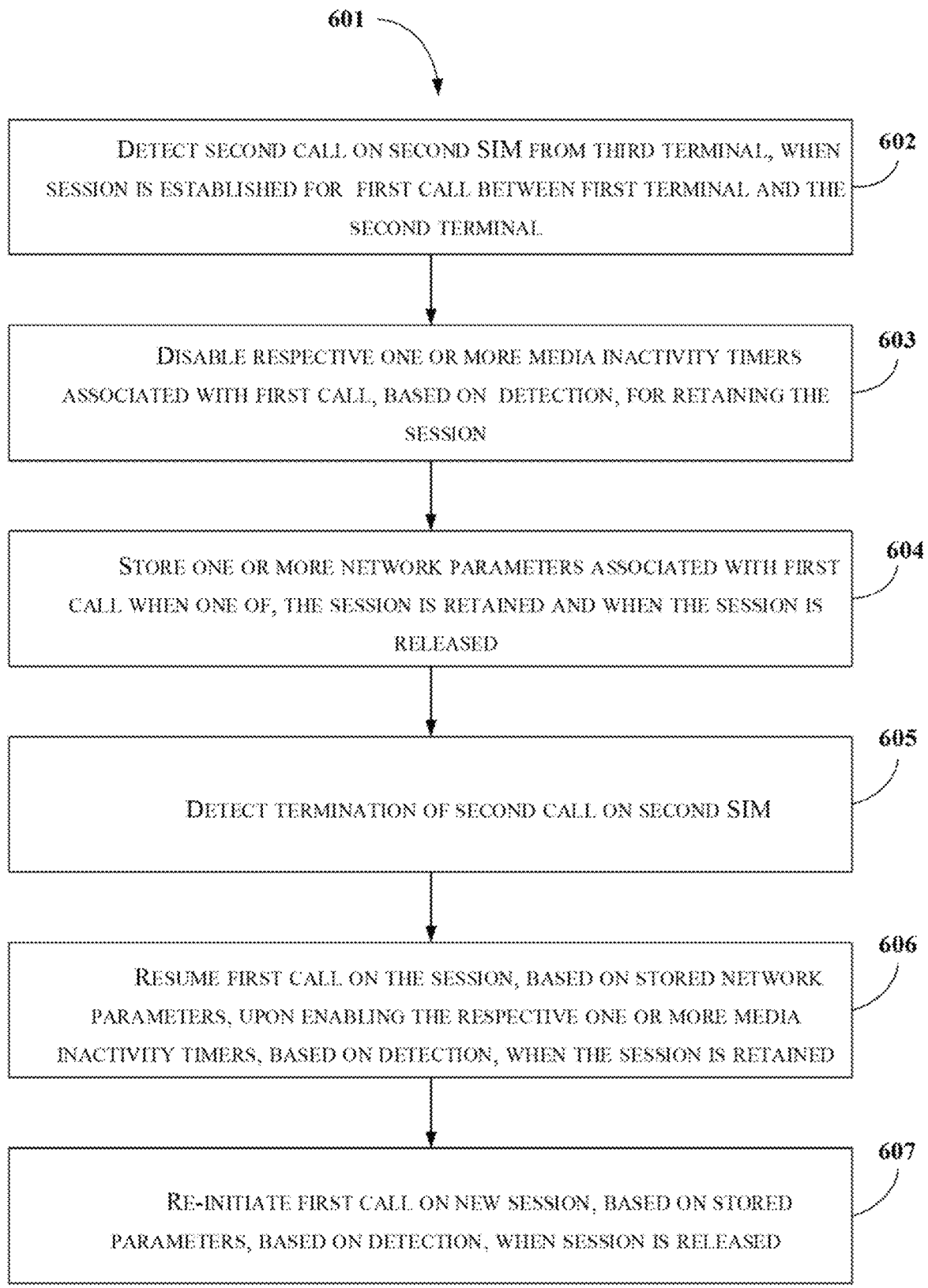
FIG. 6B shows an exemplary flow chart illustrating method steps for preventing call drop in a voice communication network, in accordance with some embodiments of the present disclosure.

FIG. 6B shows an exemplary flow chart illustrating method steps for preventing call drop in the voice communication network to overcome the call drop scenario explained in FIG. 6A, in accordance with some embodiments of the present disclosure. As illustrated in FIG. 6B, the method 601 may comprise one or more steps. The method 601 may be described in the general context of computer executable instructions. Generally, computer executable instructions can include routines, programs, objects, components, data structures, procedures, modules, and functions, which perform particular functions or implement particular abstract data types.

The order in which the method 601 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step 602, the first terminal 201 detects the second call on the second SIM from a third terminal, when the session is established for the first call between the first terminal 201 and the second terminal 202. The first terminal 201 and the second terminal 202 may be on the first call using the first SIM. The first terminal 201 may detect the second call from the third terminal on the second SIM. The first terminal 201 sends a SIP RE-INVITE message to the second terminal 202 to put the first call on-hold. The first terminal 201 includes a proprietary MIME (Multipurpose Internet Mail Extensions) body in the SIP RE-INVITE message to indicate the second terminal 202 to disable the one or more media inactivity timers. Optionally existing parameters in Session Description Protocol (SDP) body may be updated to value 0 to disable RTCP transmission during the on-hold condition. Referring to the flow diagram 608, steps 1 and 2 illustrates the first call established between the first terminal 201 and the second terminal 202. Step 3 shows the second call detected from the third terminal. At step 4, the first user associated with the first terminal 201 accepts the second call from the third terminal. At step 6, the first terminal 201 sends the SIP RE-INVITE message along with proprietary MIME body to the second terminal 202.

Figure 6C:
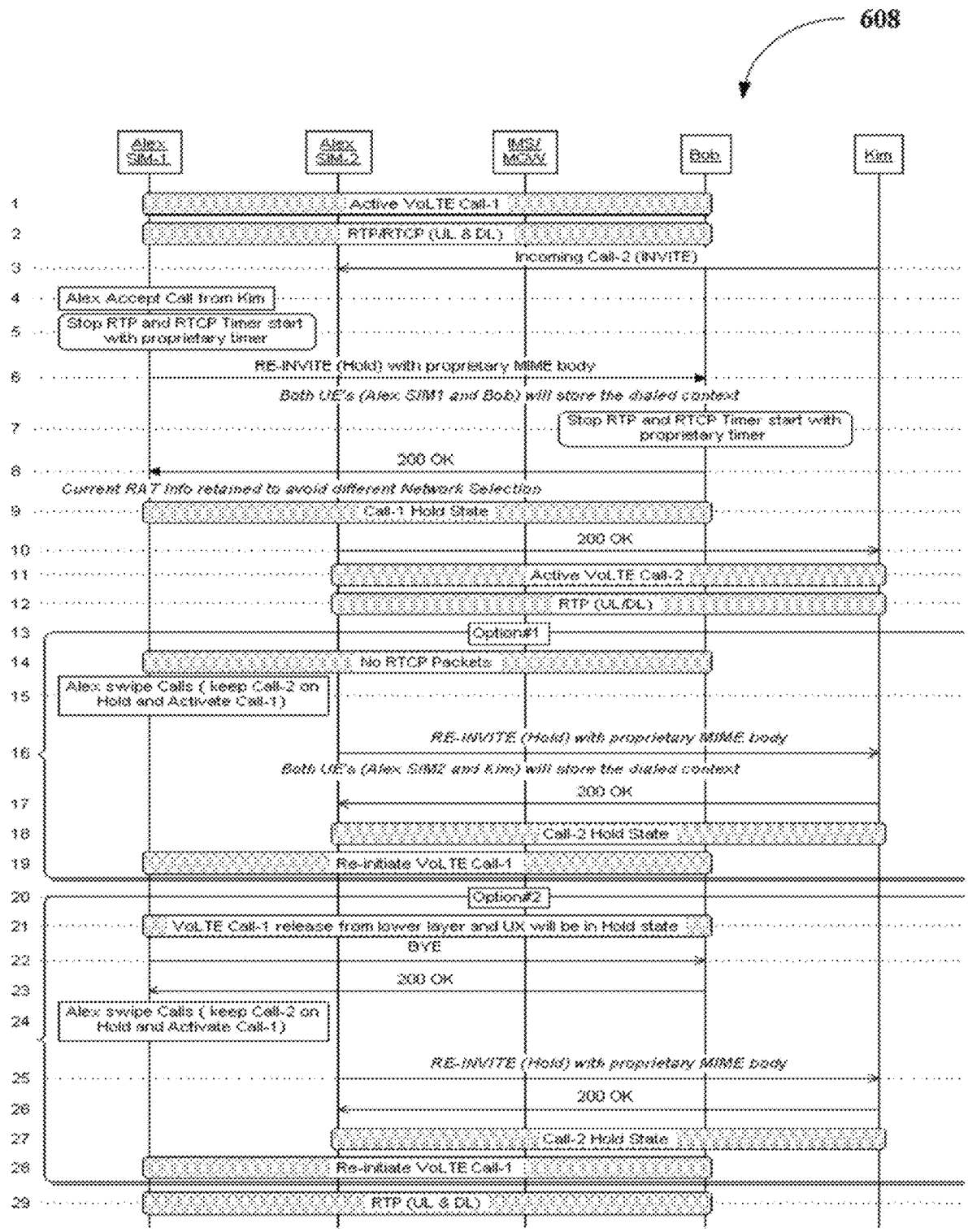
FIG. 6C shows an exemplary flow diagram illustrating method steps for preventing call drop in a voice communication network, in accordance with some embodiments of the present disclosure.

Referring back to FIG. 61, at step 603, the first terminal 201 and the second terminal 202 disables respective one or more media inactivity timers associated with the first call, based on the detection, for retaining the session as shown in steps 5-8 in the flow diagram 608 in FIG. 6C. Further, the respective monitoring timers are enabled.

Referring back to FIG. 6B, at step 604, the first terminal 201 and the second terminal 202 stores the one or more network parameters associated with the first call when one of, the session is retained and when the session is released as shown in step 9 in the flow diagram 608 in FIG. 6C. The first call is in on-hold state. Steps 10-12 illustrates the second call active between the first terminal 201 and the third terminal. Step 14 illustrates no RTCP packets transmitted to the second terminal 202 from the first terminal 201.

Referring back to FIG. 68, at step 605, the first terminal 201 and the second terminal 202 detects termination of the second call on the second SIM. In an example, the first terminal 201 may put the second call with the third terminal on-hold to resume the first call with the first terminal 201 on the first SIM as shown in the steps 15-18 in the flow diagram 608 in FIG. 6C.

Referring back to FIG. 6B, at step 606, the first terminal 201 and the second terminal 202 resumes the first call on the session, based on the stored network parameters, when the session is retained. When the first terminal 201 terminates the second call or puts the second call on-hold state, the first terminal 201 enables the one or more media inactivity timers. The first terminal 201 resumes the first call on the same session. Further, the second terminal 202 resumes the first call on the same session upon receiving the SIP INFO message from the first terminal 201. The first terminal 201 and the second terminal 202 disables the respective monitoring timers. Step 19 in the flow diagram 608 in FIG. 6C illustrates the resuming of the first call between the first terminal 201 and the second terminal 202.

Referring back to FIG. 6B, at step 607, the first terminal 201 and the second terminal 202 re-initiates the first call on a new session, based on the stored network parameters, when the session is released. The first terminal 201 and the second terminal 202 may re-initiate the call with the same contact on a new session, using the stored call information.

The information related to the session and the new session may be mapped based on respective call IDs to re-initiate the voice call with the same contact. Further, the first terminal 201 may include SIP replaces header to indicate the second terminal 202 about re-initiating the call on the new session. The second terminal 202 maps the information related to the session and the new session based on the respective call IDs. The voice call is re-initiated on the new session. Referring again to the flow diagram 608, steps 20-28 illustrate re-initiating the first call on the new session by mapping the information related to the session and the new session based on the respective call IDs. The first terminal 201 and the second terminal 202 will continue the call and transmit the RTP packets as shown step 29.

In an embodiment, a data session on the first SIM is switched to the second SIM when the second call is detected on the second SIM. In Dual Mobile Data (DMD) mode, Radio Frequency (RF) transmission arbitration is reduced by moving internet or general packet services to the stack with active call (second call). This aids in quick re-establishment when switching between held call to active call. When the active call in on the second SIM, the mobile data is switched to the second SIM when the DMD mode is ON. This will allow voice call and mobile data to continue on the second SIM, there by achieving minimal RF transmission arbitration. This allows switching of the data session to the second SIM during active call on the second SIM and switch back data to Default SIM (for example, first SIM) once the call is ended on the second SIM. The switching of the data session to the second SIM is based on one or more parameters associated with the second SIM. The one or more parameters may comprise, but not limited to, ability of the second SIM to provide similar throughputs and quality of service, services or applications (example: file download in RCS on internet PDN) are not disconnected, and data subscription is valid on the second SIM.

Figure 7:
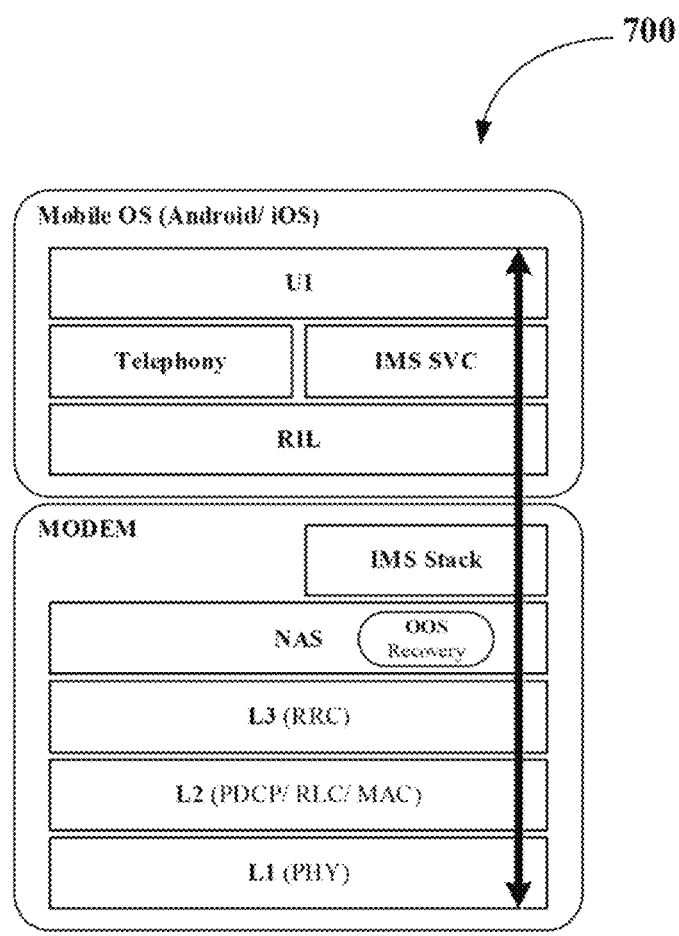
FIG. 7 illustrates overview architecture and interfaces in a terminal for preventing voice call drop in the communication network, in accordance with some embodiments of the present disclosure.

FIG. 7 illustrates overview architecture and interfaces in the terminal for preventing voice call drop in the communication network, in accordance with some embodiments of the present disclosure. The terminal may comprise a communication interface, a processor, and a memory (not shown in Figures). In some embodiments, the memory may be communicatively coupled to the processor. The memory stores instructions executable by the one or more processors. The one or more processors may comprise at least one data processor for executing program components for executing user or system-generated requests. The memory may be communicatively coupled to the one or more processors. The memory stores instructions, executable by the one or more processors, which, on execution, may cause the one or more processors to prevent voice call drop in the communication network. The communication interface is configured to transmit and receive messages/signals/control signaling. For example, the communication interface may be configured to transmit and receive the SIP signaling messages. FIG. 7 explains the architecture of wireless protocol stack at high level. Sub modules of the terminal such as User Interface (UI), IMS Stack, IMS SVC, OOS recovery are enhanced to support the prevention of voice call drop. Further, UX changes are made on mobile operating system call-dialer interface (OS-Android, iOS, et al.) to support the prevention of voice call drop (for example, elevator mode). Inputs and configurations received on UX forwarded further to 3GPP protocol modules on the terminal. IMS stack constructs new header and payload using this information to communicate with peer entities. New IMS feature tag is included to indicate network about elevator mode support.

The underlying IMS protocol may is modified to configure RTP/RTCP timer value and send the SIP INFO message to peer entity indicating network outage possibility leading to mute or voice distortion. Further, Non-access stratum (NAS) may take educated decision to defer handover procedures to other Radio Access Network (RAN)(3G/LTE) as it might fail during ongoing transient network outage conditions. On receiving indications of the terminal exiting the low-signal area, NAS can optionally resume deferred handover procedures.

FIGS. 8A and 8B illustrates call setup and call drop comparison between existing systems and the present invention. The call setup time in the existing systems (A) is greater than the call setup time in the present invention (B). FIG. 8C shows a RTP graph in which an audio session resumed in 2.1 s while traditional method delays recovery and, user had to re-initiate the call.

The present disclosure allows the user to control call status in the low-signal area, to avoid call drop. With such a pause-resume kind of feature, user experience is boosted. Further, network resources are saved since the voice call is resumed on the same session. Also, the network parameters are stored to avoid re-configuration of the network parameters when the user exits the low-signal area.

When the session is released, the voice call is re-initiated on the new session based on the stored network parameters. This ensures that the call is not dropped even when the session is released. Hence, the user can continue the call when the user exists the low-signal area and experience is further enhanced. Further, this will avoid users associated with the first terminal and the second terminal calling together same time when re-attempting to make the call, which can lead call fail permanently. Also, multiple call attempts by users are avoided.

The session is released from lower layers of the voice communication network. The dialer window on the UX will be in a same state. This improves the user experience since a pause-resume kind of experience is provided to the first user and the second user, when the session is released and re-established in the lower layers of the voice communication network.

In DMD mode. RF transmission arbitration is reduced by moving internet or general packet services to the stack with active call (second call). This aids in quick re-establishment when switching between held call to active call. When the active call in on the second SIM, the mobile data is switched to the second SIM when the DMD Mode is ON. This will allow voice call and mobile data to continue on the second SIM, there by achieving minimal RF transmission arbitration. This allows switching of the data session to the second SIM during active call on the second SIM and switch back data to Default SIM once the call is ended on the second SIM. The switching of the data session to the second SIM is based on one or more parameters associated with the second SIM. The one or more parameters may comprise, but not limited to, ability of the second SIM to provide similar throughputs and quality of service, services or applications (example: file download in RCS on internet PDN) are not disconnected, and data subscription is valid on the second SIM.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 4A, 5A, and 6B show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

REFERRAL NUMERALS

| Referral number | Decription |
| --- | --- |
| 100 | VoLTE architecture |
| 101 | UAC |
| 102 | IMS |
| 103 | UAS |
| 104 | LTE network |
| 200 | Environment |
| 201 | First terminal |
| 202 | Second terminal |
| 203 | Server |

We claim:

1. A method of preventing call drop in a voice communication network, the method comprising:
   receiving, by a first terminal and a second terminal, a first indication that the first terminal is entering a low-signal area when a session is established for a voice call initiated between the first terminal and the second terminal;
   disabling, by the first terminal and the second terminal, respective one or more media inactivity timers based on the first indication for retaining the session;
   storing, by the first terminal and the second terminal, one or more network parameters associated with the first terminal when one of, the session is retained and when the session is released;
   receiving, by the first terminal and the second terminal, a second indication that the first terminal has exited the low-signal area; and
   when the session is retained, resuming, by the first terminal and the second terminal, the voice call on the session based on the stored network parameters upon enabling the respective one or more media inactivity times based on the second indication;
   when the session is released, re-initiating, by the first terminal and the second terminal, the voice call on a new session based on the stored network parameters based on the second indication.

2. The method as claimed in claim 1, wherein the first indication and the second indication are received by the first terminal from a user interface of the first terminal, wherein the first indication and the second indication are received by the second terminal from the first terminal via a server.

3. The method as claimed in claim 1, wherein the one or more media inactivity timers are a Real Time Transport Protocol (RTP) timer and a Real-time Transport Control Protocol (RTCP) timer.

4. The method as claimed in claim 1, wherein the one or more network parameters comprises at least one of, a Registered Public Land Mobile Network (RPLMN), a Radio Access Technology (RAT), and a frequency of respective camped cell associated with the first terminal and the second terminal.

5. The method as claimed in claim 1, further comprises:
   enabling, by the first terminal and the second terminal, respective monitoring timer when the respective one or more media inactivity timers are disabled, wherein the respective one or more media inactivity timers are disabled for a time duration of the respective monitoring timer.

6. The method as claimed in claim 1, wherein the session is released by one of, the first terminal and a server.

7. The method as claimed in claim 1, further comprises storing call information prior to the session is released.

8. The method as claimed in claim 1, wherein re-initiating the voice call on the new session based on the call information comprises:
   obtaining a first call Identity (ID) associated with the session;
   assigning a second call ID to the new session; and
   mapping information related to the session and the new session based on respective call IDs.

9. A method of preventing call drop in a voice communication network, the method comprising:
   receiving, by a server from a first terminal, a first indication that the first terminal is entering a low-signal area, when the server has established a session for a voice call between the first terminal and a second terminal using a first Radio Access Technology (RAT);
   preventing the first terminal from connecting to a second RAT by intercepting, by the server, a handover procedure for the first terminal, upon receiving the first indication;
   disabling, by the first terminal, one or more media inactivity timers associated with the session based on the first indication;
   retaining, by the server, the session, when the first terminal is disconnected from the first RAT Radio Access Technology (RAT) associated with the first terminal;
   receiving, by the server, from the first terminal, a second indication indicating that the first terminal has exited the low-signal area;
   enabling, by the first terminal, the one or more media inactivity timers associated with the session based on the second indication; and
   resuming, by the server, the voice call on the session based on the second indication.

10. A method of preventing call drop in a voice communication network, the method comprising:
    detecting, by a first terminal comprising a first Subscriber Identity Module (SIM) and a second SIM, wherein the first terminal is established in a first call with a second terminal using the first SIM, a second call on the second SIM from a third terminal, when a session is established for the first call between the first terminal and the second terminal;
    disabling, by the first terminal and the second terminal, respective one or more media inactivity timers associated with the first call based on the detection for retaining the session;
    storing, by the first terminal and the second terminal, one or more network parameters associated with the first call when one of, the session is retained and when the session is released;
    detecting, by the first terminal and the second terminal, termination of the second call on the second SIM; and
    when the session is retained, resuming, by the first terminal and the second terminal, the first call on the session based on the stored network parameters upon enabling the respective one or more media inactivity timers based on the detection;
    when the session is released, re-initiating, by the first terminal and the second terminal the first call on a new session based on the stored network parameters based on the detection.

11. The method as claimed in claim 10, wherein a data session on the first SIM is switched to the second SIM when the second call is detected on the second SIM.

12. The method as claimed in claim 11, wherein the switching is further based on one or more parameters associated with the second SIM.

13. The method as claimed in claim 10, wherein the one or more media inactivity timers are a Real Time Transport Protocol (RTP) timer and a Real-time Transport Control Protocol (RTCP) timer.

* * * * *